US005446638A

United States Patent [19]

Matsuzaki et al.

[11] Patent Number: 5,446,638

[45] Date of Patent: Aug. 29, 1995

[54] REFLECTOR MOLDED OF SYNTHETIC RESIN FOR A LIGHTING DEVICE MOUNTED ON A VEHICLE

[75] Inventors: Makio Matsuzaki, Meguro; Shigeru Furuya, Yokohama, both of Japan

[73] Assignee: Stanley Electric Co., Ltd., Tokyo, Japan

[21] Appl. No.: 105,888

[22] Filed: Aug. 11, 1993

[30] Foreign Application Priority Data

Aug. 12, 1992 [JP] Japan .............................. 4-061979 U

[51] Int. Cl.[6] .......................... B60Q 1/04; F21V 29/00

[52] U.S. Cl. ....................................... 362/341; 362/80; 362/294; 362/345

[58] Field of Search .................... 362/61, 80, 341, 294, 362/345, 346, 349, 350, 373, 347

[56] References Cited

U.S. PATENT DOCUMENTS

| | | | |
|---|---|---|---|
| 1,457,058 | 5/1923 | Fitchet | 362/345 |
| 2,799,773 | 7/1957 | Schwartz | 362/345 |
| 4,833,572 | 5/1989 | Nagengast et al. | 362/61 |
| 5,003,446 | 3/1991 | Nagengast et al. | 362/345 |
| 5,010,453 | 4/1991 | Ketterman | 362/61 |
| 5,095,410 | 3/1992 | Nagengast et al. | 362/294 |
| 5,251,111 | 10/1993 | Nagengast et al. | 362/294 |

FOREIGN PATENT DOCUMENTS 2093580 9/1982 United Kingdom .

*Primary Examiner*—Ira S. Lazarus
*Assistant Examiner*—Y. Quach
*Attorney, Agent, or Firm*—Weingarten, Schurgin, Gagnebin & Hayes

[57] ABSTRACT

A reflector molded of a synthetic resin for a lighting device mounted on a vehicle is provided, wherein a slit is transversely formed directly below a joint line defined by a reflective surface and an upper flat surface of the reflector with an optical axis as a center in order to minimize or eliminate the undesirable thermal deformation of the reflector when a light source is continuously turned on for a time longer than a predetermined one. Usually, the extent of transverse extension of the slit is determined with the optical axis of the reflector as a center depending on a quantity of electricity consumed by the light source, a distance between the light source and the upper flat surface and an area of the upper flat surface. In case that the reflective surface of the reflector is designed in an asymmetrical configuration, the extent of transverse extension of the slit is determined asymmetrically relative to the optical axis of the reflector corresponding to the degree of asymmetry of the reflective surface.

4 Claims, 2 Drawing Sheets

Prior Art

REFLECTOR MOLDED OF SYNTHETIC RESIN FOR A LIGHTING DEVICE MOUNTED ON A VEHICLE

BACKGROUND OF THE INVENTION

1. Field of the Invention

The present invention relates generally to a lighting device such as a headlight, an auxiliary headlight or the like mounted on a vehicle. More particularly, the present invention relates to improvement of a reflector for the lighting device of the foregoing type.

2. Background Art

To facilitate understanding of the present invention, a typical conventional reflector for a lighting device of the foregoing type will be described below with reference to FIG. 3 to FIG. 5.

FIG. 3 shows by way of perspective view the structure of a reflector 91 for a lighting device 90 mounted on a vehicle (not shown). The reflector 91 is molded of a synthetic resin and includes a reflective surface 91*a* having a predetermined configuration composed of, e.g., a revolving parabolic plane, and a light source 92 such as a halogen lamp or the like is disposed at the position substantially coincident with a focus of the reflective surface 91*a*. In addition, a lens 93 is arranged ahead of the reflector 91 so that the lighting device 90 exhibits desired light distribution properties. For the purpose of adequately coordinating the configuration of the reflector 91 with the design of a vehicle, upper and lower parts of the reflector 91 are cut out to form an upper flat surface 91*b* and a lower flat surface 91*c* both of which extends in parallel with an optical axis Z of the lighting device 90.

With respect to the lighting device 90 constructed in the above-described manner, it has been found that the light distribution properties immediately after it is turned on vary from the light distribution properties when it is continuously turned on for a predetermined period of time, e.g., ten minutes. This variation of the light distribution properties of the lighting device is exemplified with reference to the light distribution properties employable in case that a light beam is irradiated toward a vehicle running in the opposite direction as illustrated in FIG. 4 and FIG. 5. Specifically, FIG. 4 shows light distribution properties H0 of the lighting device 90 immediately after the light source 92 is turned on, and FIG. 5 shows light distribution properties H1 when the light source 92 is continuously turned on for ten or more minutes. In contrast with the light distribution properties H0, the light beam distribution properties H1 has a separate part H1*a* which represents that a part of the reflected light beam is slantwise upward irradiated by angle of about 0.6 degree relative to a horizontal plane H.

The appearance of the separate part H1*a* in that way leads to a problem that a dazzling light beam is generated in the practical use wherein the light source 92 is normally continuously turned on for a certain time. In addition, there arises another problem that visual recognizability of the lighting device 90 is degraded because of undesirable deformation of the contour representing the light distribution properties. To prevent the dazzling light beam from being irradiated from the lighting device 90, it is necessary that when the lighting device 90 is mounted on a vehicle, a controlling unit (not shown) for the lighting device 90 is preliminarily adjusted such that the optical axis of the lighting device 90 is automatically corrected after the light source 92 is continuously turned on for a certain time, e.g., 10 or more minutes, resulting in an idling time being unavoidably required.

SUMMARY OF THE INVENTION

The present invention has been made in consideration of the aforementioned background.

An object of the present invention is to provide a reflector molded of a synthetic resin for a lighting device mounted on a vehicle wherein there does not arise a malfunction that a dazzling light beam unpleasant for a driver in another vehicle running in the opposite direction is not irradiated from the lighting device.

Another object of the present invention is to provide a reflector of the foregoing type which assures that the undesirable thermal deformation of the reflector caused as a light source is continuously turned on for a long time can be minimized or eliminated.

The present invention provides a reflector molded of a synthetic resin for a lighting device mounted on a vehicle wherein the lighting device includes a light source at the position substantially coincident with the focus of a reflective surface of the reflector having a revolving parabolic plane, and upper and lower end parts of the reflector are cut out to form an upper flat surface and a lower flat surface both of which extends in parallel with an optical axis of the reflector, wherein a slit is transversely formed directly below a joint line defined by the reflective surface and the upper flat surface with the optical axis of the reflector as a center.

Usually, the extent of transverse extension of the slit is determined with the optical axis of the reflector as a center in consideration of a quantity of electricity consumed by the light source, a distance between the light source and the upper flat surface, and an area of the upper flat surface.

In case that the reflective surface of the reflector is designed in an asymmetrical configuration, the extent of transverse extension of the slit is determined asymmetrically relative to the optical axis of the reflector corresponding to the asymmetrical configuration of the reflective surface of the reflector.

Other objects, features and advantages of the present invention will become apparent from reading of the following description which has been made in conjunction of the accompanying drawings.

BRIEF DESCRIPTION OF THE DRAWINGS

The present invention is illustrated in the following drawings in which:

FIG. 4 is a graph which illustrates light distribution properties of the conventional reflector shown in FIG. 3 immediately after a light source is turned on.

3 when the light source is continuously turned on for a timer longer than a predetermined one.

DETAILED DESCRIPTION OF THE PREFERRED EMBODIMENTS

The present invention will now be described in detail hereinafter with reference to FIG. 1 and FIG. 2 which illustrate a preferred embodiment thereof.

Figure 1:
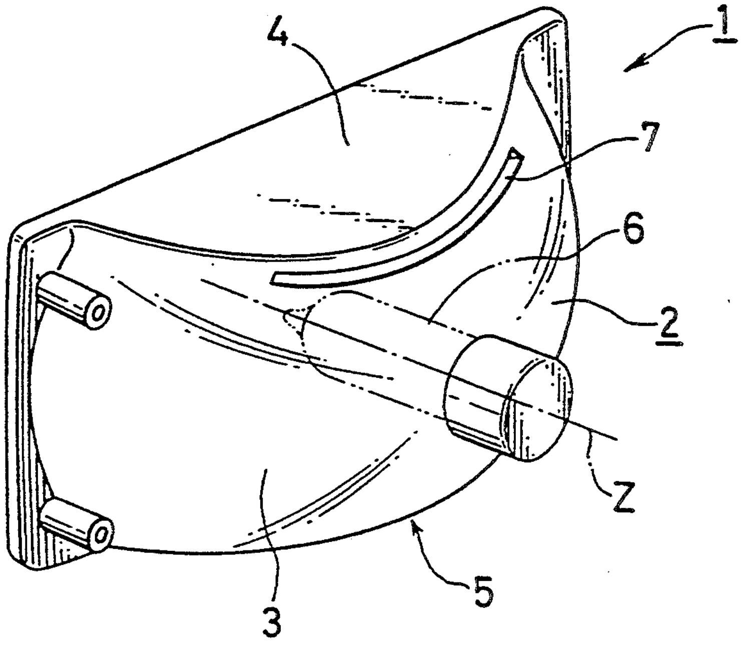
FIG. 1 is a perspective view of a reflector molded of a synthetic resin for a lighting device mounted on a vehicle according to an embodiment of the present invention, particularly showing the structure of the reflector as seen from the rear side.
Figure 3:
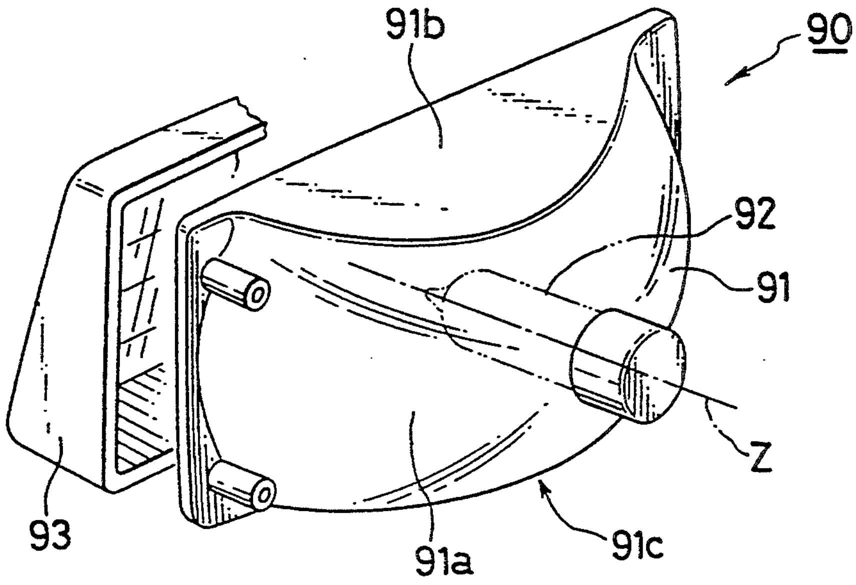
FIG. 3 is a perspective view of a conventional reflector or the foregoing type as seen from the rear side.
Figure 4:
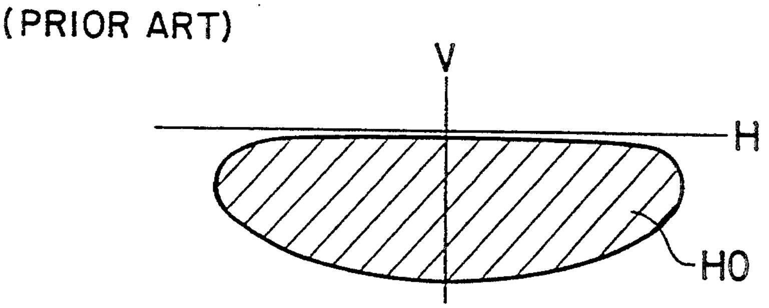
FIG.4 (PRIOR ART)

Referring to FIG. 1, a lighting device for a vehicle is generally designated by reference numeral 1. The lighting device 1 includes a reflector 2 which is molded of a synthetic resin and constructed according to the embodiment of the present invention. The reflector 2 includes a reflective surface 3 having a predetermined configuration composed of a revolving parabolic plane of which upper and lower end parts are cut out to form an upper flat surface 4 and a lower flat surface 5 extending in parallel with an optical axis Z of the reflector 2, and a light source 6 such as a halogen lamp or the like is disposed at the position substantially coincident with a focus of the reflective surface 3 in the same manner as the conventional lighting device 90 described above with reference to FIG. 3. In addition, a lens (not shown)is arranged ahead of the reflector 2 to provide desired light distribution properties for the lighting device 1.

In this embodiment, a slit 7 is transversely formed directly below a joint line defined by the reflective surface 3 and the upper flat surface 4 while extending in parallel with the joint line. Basically, the slit 7 is formed through the reflector 2 in the opposite directions by a same length with the optical axis Z as a center. An asymmetrical slit 7' is shown in FIG. 1'.

Figure 2:
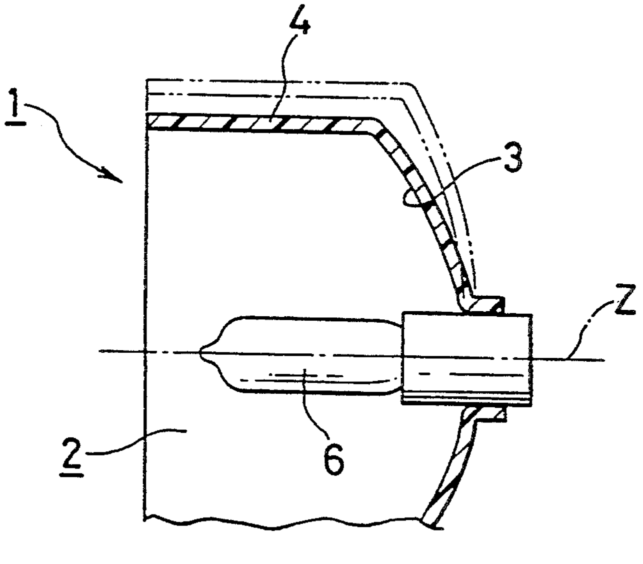
FIG. 2 is a fragmentary sectional view of a reflector shown in FIG. 1, particularly showing in the exaggerated state that the reflector is thermally deformed as illustrated by phantom lines.
Figure 5:
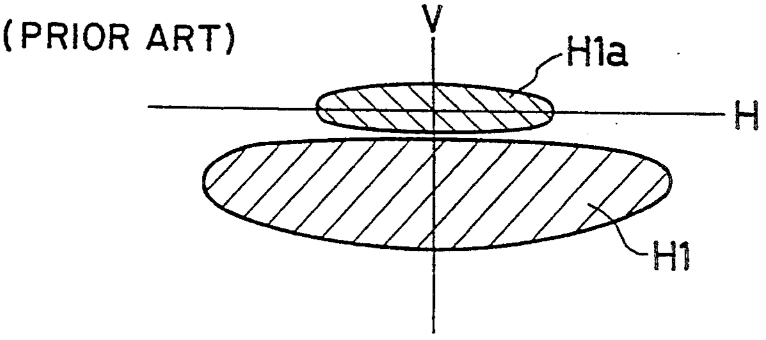
FIG.5 (PRIOR ART)
FIG. 5 is a graph which illustrates light distribution properties of the conventional reflector shown in FIG.

FIG. 2 is a fragmentary sectional view of the lighting device, particularly showing in the exaggerated state that the reflector 2 is thermally deformed when the light source 6 is continuously turned on for a long time. Specifically, as the light source 6 is continuously turned on, heat is increasingly generated, causing air in the reflector 2 to convectively flow in the upward direction. Since the upper flat surface 4 is located directly above the light source 6, it is largely thermally expanded due to the elevated temperature as represented by phantom lines compared with the other part of the reflector 2 rather than the upper flat surface 4. Thus, a part of the reflective surface 3, especially, the upper part of the same is upwardly deformed, causing the slantwise upward orienting dazzling light beam to be irradiated from the reflective surface 3 with the result that the light distribution properties are undesirably degraded (as illustrated by the separate part H1*a* in FIG. 5). Incidentally, the other part of the reflector 2 rather than the upper flat surface 4 is uniformly heated at a low rate with a few thermal expansion without any significant effect on the light distribution properties of the lighting device 1.

Since the formation of the slit 7 in the above-described manner prevents the large local thermal expansion of the upper flat surface 4 from being conducted to the reflective surface 3, a large part of the reflective surface 3 is not undesirably locally deformed. Thus, there does not arise a malfunction that a dazzling light beam is irradiated from the lighting device 1.

With the construction as mentioned above, the length of the slit 7 in the transverse direction is determined with the optical axis Z of the reflector 2 as a center within the range located directly above the light source 6 having an elevated temperature. Since the extent of transverse extension of the slit 7 should be changed depending on a quantity of electricity consumed by the light source 6, a distance between the light source 6 and the upper flat surface 4, and an area or dimensions of the upper flat surface 4, it is preferable that the length of the slit 7 is determined based on the results derived from a variety of experiments.

In case that the reflector 2 is designed in the asymmetrical configuration relative to the optical axis Z of the reflector 2 for some reason, there does arise an occasion that the reflective surface 3 is asymmetrically thermally affected by the light source 6 via the upper flat surface 4. For this reason, it is desirable that the extent of transverse extension of the slit 7 is asymmetrically determined with the optical axis Z of the reflector 2 as a center.

The slit 7 can easily be formed on the reflector 2 at the same time when the reflector 2 is molded of a synthetic resin, merely by slightly modifying an injection molding die presently employed for injection-molding the reflector 2. Therefore, the number of steps required for producing the lighting device 1 is not increased at all.

While the present invention has been described above with respect to a single embodiment thereof, it should of course be understood that the present invention should not be limited only to this embodiment but various change or modification may be made without any departure from the scope of the present invention as defined by the appended claims.

What is claimed is:

1. A lighting device comprising:
   - a curved reflective surface, said curved reflective surface having a focal point and an optical axis;
   - an upper flat surface and a lower flat surface, said upper flat surface connected to said curved reflective surface by a first joint line, said lower flat surface connected to said curved reflective surface by a second joint line, said upper flat surface and said lower flat surface being substantially parallel;
   - a light source positioned at said focal point; and
   - a slit disposed in said curved reflective surface, said slit transversely positioned below and substantially parallel to said first joint line and above said light source and in a selected relationship with respect to said curved reflective surface and said optical axis, said slit disposed in a region proximate to first said and just below joint line to minimize the effect on light reflected by said reflective surface from said source in a forward direction.

2. The lighting device of claim 1, wherein said selected relationship of said slit relative to said curved reflective surface and said optical axis is symmetrical.

3. The lighting device of claim 1, wherein said selected relationship of said slit relative to said curved reflective surface and said optical axis is asymmetrical.

4. The lighting device of claim 1, wherein the length of said slit is a function of the output of said light source, the distance between said light source and said upper flat surface, and the area of said upper flat surface.

* * * * *

UNITED STATES PATENT AND TRADEMARK OFFICE

CERTIFICATE OF CORRECTION

PATENT NO. : 5,446,638

DATED : August 29, 1995

INVENTOR(S) : Makio Matsuzaki, et al.

It is certified that error appears in the above-indentified patent and that said Letters Patent is hereby corrected as shown below:

Column 4, claim 1, lines 46/47, "below and substantially parallel to said first" should read --below said first--.

Column 4, claim 1, lines 50/51, "to first said and just below joint line" should read --to said first joint line--.

Signed and Sealed this

Twenty-seventh Day of August, 1996

Attest:

Bruce Lehman

BRUCE LEHMAN

*Attesting Officer*

*Commissioner of Patents and Trademarks*